(12) United States Patent
Chang

(10) Patent No.: US 7,703,246 B2
(45) Date of Patent: Apr. 27, 2010

(54) SOLAR PANEL MOUNTING STRUCTURE

(75) Inventor: Ching-Lang Chang, Antioch, CA (US)

(73) Assignee: Beautiful World LLC, Antioch, CA (US)

( * ) Notice: Subject to any disclaimer, the term of this patent is extended or adjusted under 35 U.S.C. 154(b) by 293 days.

(21) Appl. No.: 11/831,284

(22) Filed: Jul. 31, 2007

(65) Prior Publication Data

US 2009/0031647 A1    Feb. 5, 2009

(51) Int. Cl.
    E04D 13/18    (2006.01)
(52) U.S. Cl. .................. 52/173.3; 52/64; 248/183.4
(58) Field of Classification Search .............. 52/64, 52/173.3; 248/292.12, 183.4; 49/197, 199; 126/577, 606, 607; 74/49
    See application file for complete search history.

(56) References Cited

U.S. PATENT DOCUMENTS

| 1,594,556 | A | * | 8/1926 | Pitts ........................... 74/22 R |
| 1,907,799 | A | * | 5/1933 | Hardtke ........................ 49/210 |
| 3,450,186 | A | * | 6/1969 | Caffa et al. .................. 160/241 |
| 3,566,555 | A | * | 3/1971 | Schultz et al. ................. 52/64 |
| 3,740,011 | A | * | 6/1973 | Dickson et al. .......... 248/183.4 |
| 3,861,737 | A | * | 1/1975 | Kirkbride .............. 296/100.18 |
| 3,906,968 | A | * | 9/1975 | Black ......................... 135/132 |
| 4,276,872 | A | * | 7/1981 | Blake et al. ................. 126/578 |
| 4,586,488 | A | * | 5/1986 | Noto ........................... 126/578 |
| 4,890,599 | A |   | 1/1990 | Eiden |
| 4,901,591 | A | * | 2/1990 | Oppermann et al. ........... 74/469 |
| 6,005,236 | A | * | 12/1999 | Phelan et al. ............. 250/203.4 |
| 6,128,135 | A | * | 10/2000 | Stiles et al. .................. 359/597 |
| 6,296,217 | B1 | * | 10/2001 | Ikedo et al. ............. 248/292.12 |
| 6,421,966 | B1 | * | 7/2002 | Braunstein et al. .......... 52/173.3 |
| 6,617,506 | B2 | * | 9/2003 | Sasaki ......................... 136/246 |
| 7,051,481 | B2 | * | 5/2006 | Delavega et al. ............... 52/66 |
| 7,261,267 | B2 | * | 8/2007 | Frydkjær ............... 248/292.12 |
| 7,352,509 | B2 | * | 4/2008 | Pagel .......................... 359/596 |
| 7,531,741 | B1 | * | 5/2009 | Melton et al. ................ 136/246 |
| 2008/0040990 | A1 | * | 2/2008 | Vendig et al. .............. 52/173.3 |
| 2008/0308091 | A1 | * | 12/2008 | Corio .......................... 126/606 |
| 2009/0120016 | A1 | * | 5/2009 | Hon .......................... 52/173.3 |

* cited by examiner

*Primary Examiner*—Brian E Glessner
(74) *Attorney, Agent, or Firm*—Antonelli, Terry, Stout & Kraus, LLP; Hung H. Bui, Esq.

(57) ABSTRACT

The present invention proposes a solar panel mounting structure comprises: a frame and three gears. The frame has a first opening, a second opening and a third opening, and connects to a solar panel; the third opening is aligned with the first opening and the second opening. The first gear has a first bar; the first bar works in the first opening. The second gear has a second bar; the second bar works in the second opening. The third gear has an axle, and locates between the first gear and the second gear and gearing therein; the axle works in the third opening; thereby, the solar panel seesaws when the third gear turns.

20 Claims, 6 Drawing Sheets

SOLAR PANEL MOUNTING STRUCTURE

FIELD OF THE INVENTION

The present invention is related to a mounting structure, particularly to a solar panel mounting structure.

BACKGROUND OF THE INVENTION

Solar panels for use in commercial and residential environments are known. Solar panels are typically mounted on a mounting structure, which is supported on a mounting surface. Existing mounting structures are often overly complicated and cost much to be manufactured.

U.S. Pat. No. 4,890,599 to Eiden et al. discloses solar tracking control system selectively energizes and de-energizes a motor. However, Eiden et al. requires a complicated circuit to control the motor's rotation with clockwise and counterclockwise so as to control the solar panel frame turning corresponding to the sun tracking.

An objective of the present invention is to provide a solar panel mounting structure that uses simple and durable mechanical movement. Another objective of the present invention is to provide a solar panel mounting structure that is manufactured inexpensively.

SUMMARY OF THE INVENTION

According to the present invention, a solar panel mounting structure comprises:

a frame has a first opening, a second opening and a third opening, and connects to a solar panel; the third opening is aligned with the first opening and the second opening;

a first gear has a first bar; the first bar works in the first opening;

a second gear has a second bar; the second bar works in the second opening; and a third gear has an axle, and locates between the first gear and the second gear and gearing therein; the axle works in the third opening; thereby, the solar panel seesaws by the axle when the third gear turns.

In accordance with one aspect of the present invention, the first gear connects a first disk; the first disk locates between the first gear and the frame; the first bar connects to a side of the first disk.

In accordance with one aspect of the present invention, the second gear connects a second disk; the second disk locates between the second gear and the frame; the second bar connects to a side of the second disk.

In accordance with one aspect of the present invention, a first holder connects to the first gear; a second holder connects to second gear; a third holder connects to the third gear; thereby, the first holder, the second holder and the third holder fix on a building or the ground.

In accordance with one aspect of the present invention, the first opening is long; the second opening is long; the third opening is circular.

The present invention may best be understood through the following description with reference to the accompanying drawings, in which:

DETAILED DESCRIPTION OF THE PREFERRED EMBODIMENTS

Figure 1:
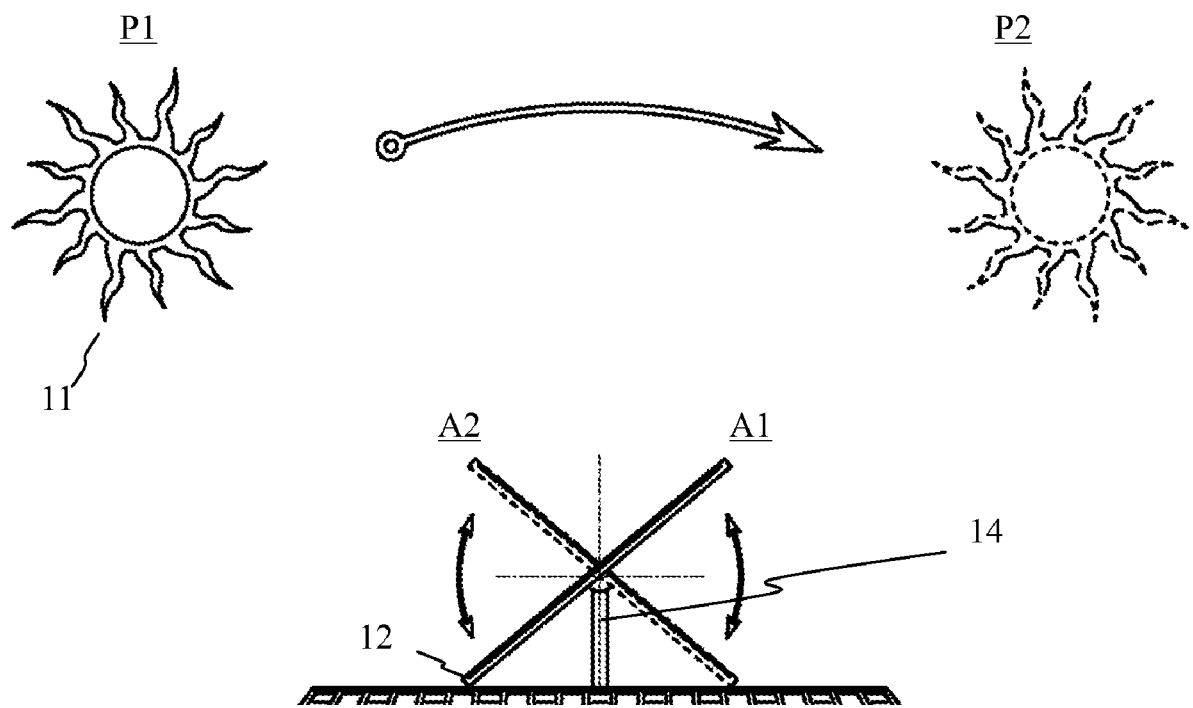
FIG. 1 illustrates one application on the ground according to the present invention.

FIG. 1 illustrates one application on the ground according to the present invention. There are a sun 11, a solar panel 12 and a holder 14 in FIG. 1.

When the sun move from position P1 to P2, the solar panel 12 will turns from angle A1 to A2 so as to track the sun and maximize the energy collecting from the sun.

Figure 2:
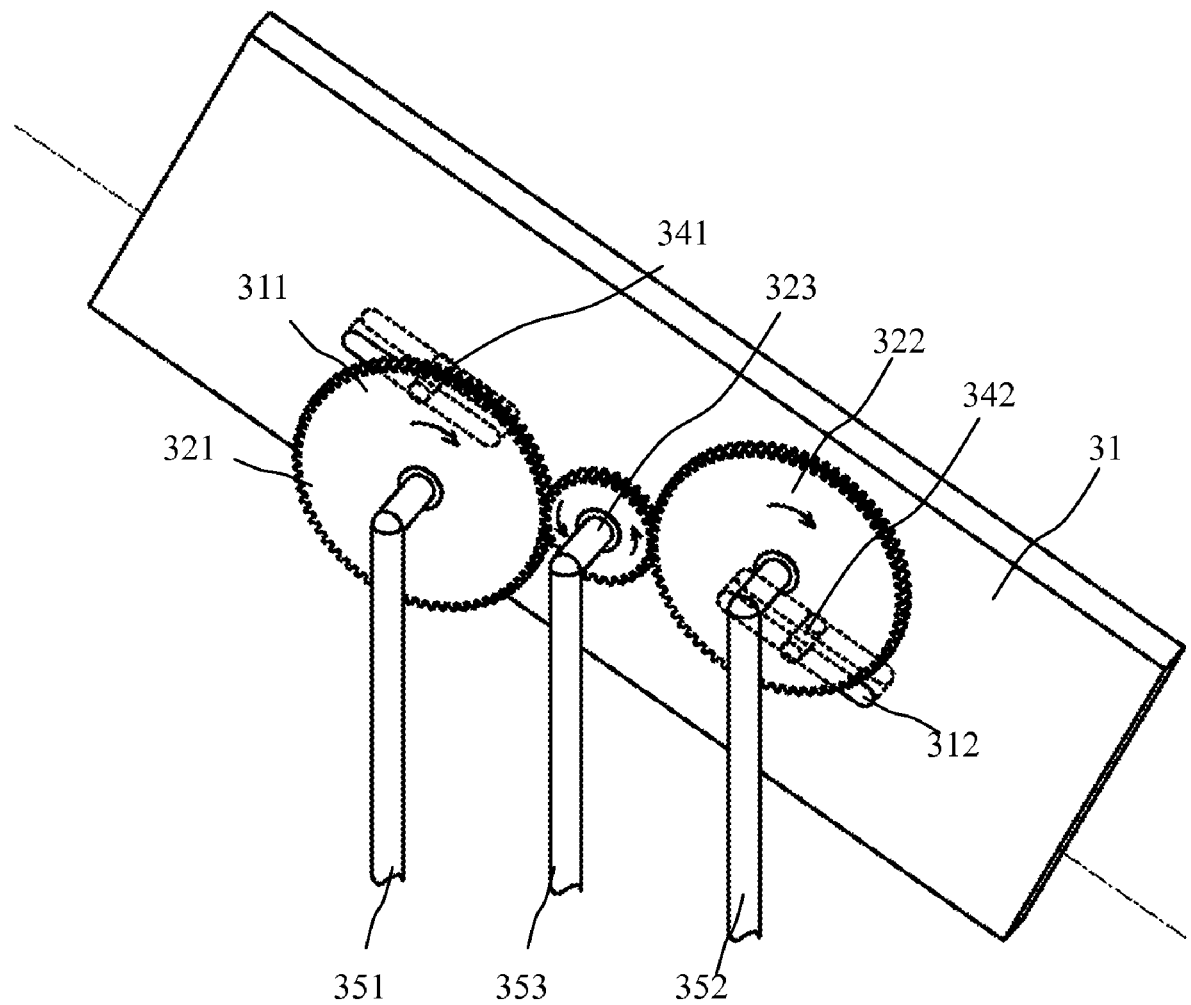
FIG. 2 illustrates the mounting structure for solar panel according to the present invention.
Figure 3:
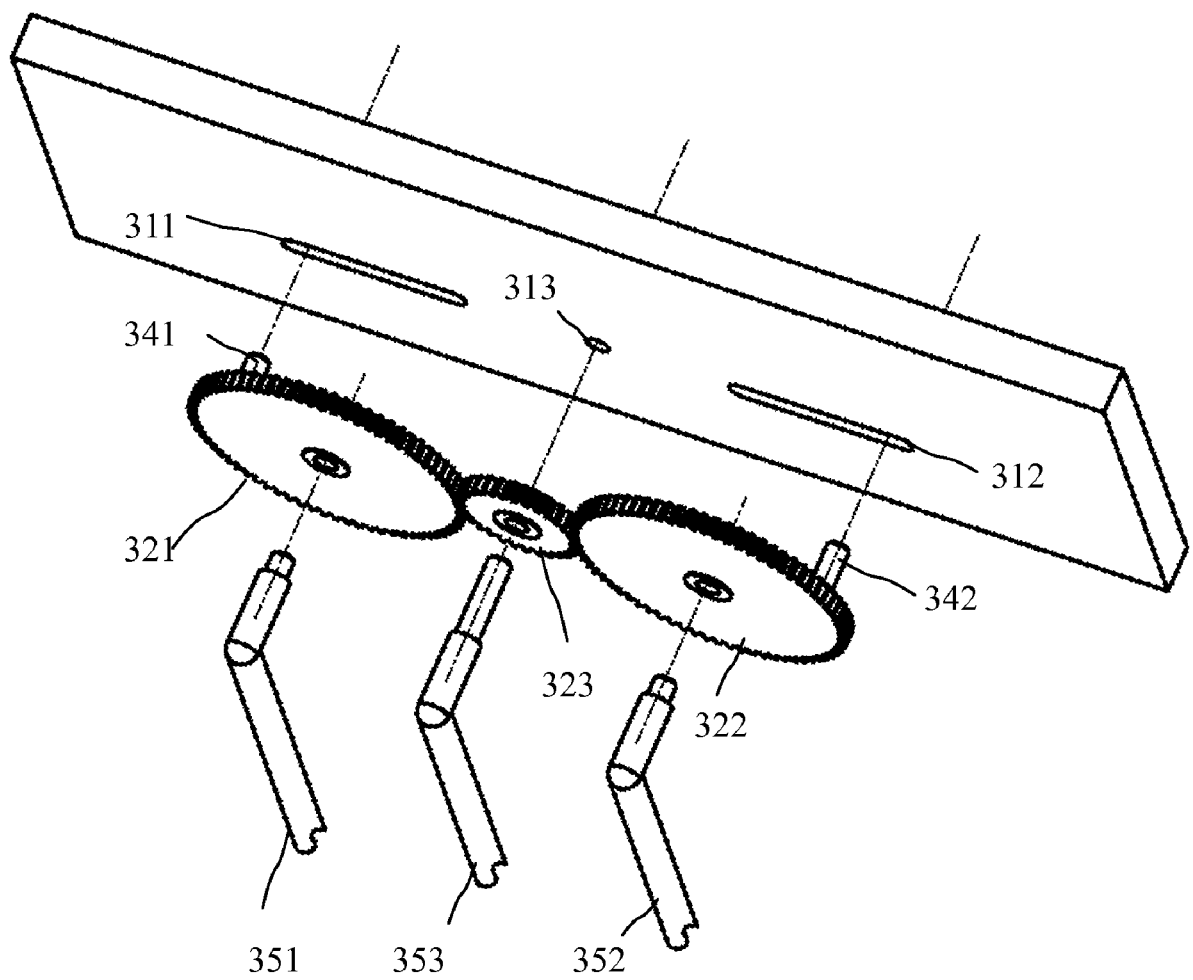
FIG. 3 illustrates the decomposed one according to FIG. 3.

FIG. 2 and FIG. 3 illustrate the mounting structure for solar panel according to the present invention. There are a frame 31, two long opening 311,312, a circular opening 313 (showed in FIG. 3), three gears 321,322,323, two bars 341, 342, three holders 351,352,353, where the three holders 351, 352, and 353 is adjustable.

The frame 31 can fix a solar panel thereon. When the frame turns, the solar panel will turn thereby. The frame has two long openings 311,312 and one circular opening 313. The bar 341 connected to gear 321 works in the long opening 311, and the bar 342 connected to gear 322 works in the long opening 312. The axel of the gear 323 works in the circular opening 313.

Figure 4:
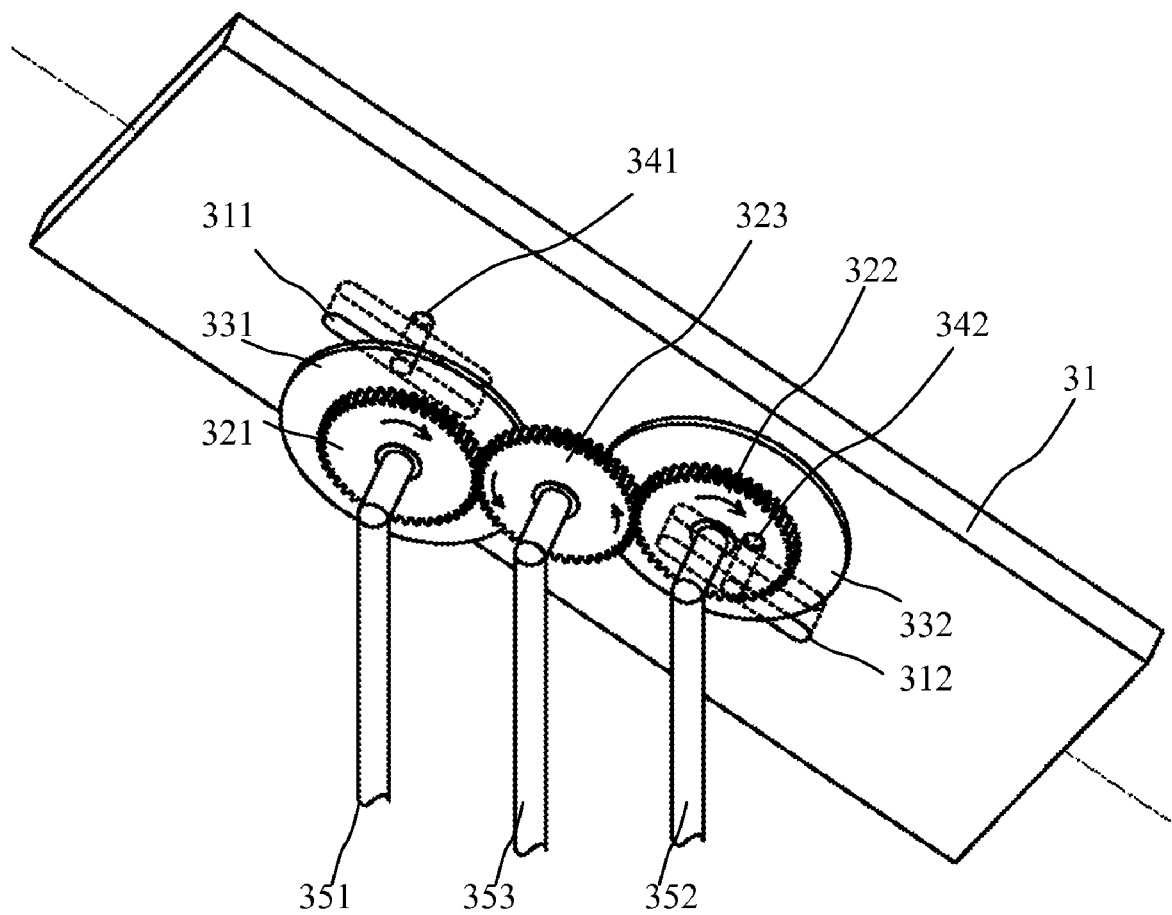
FIG. 4 illustrates another mounting structure for solar panel according to the present invention.
Figure 5:
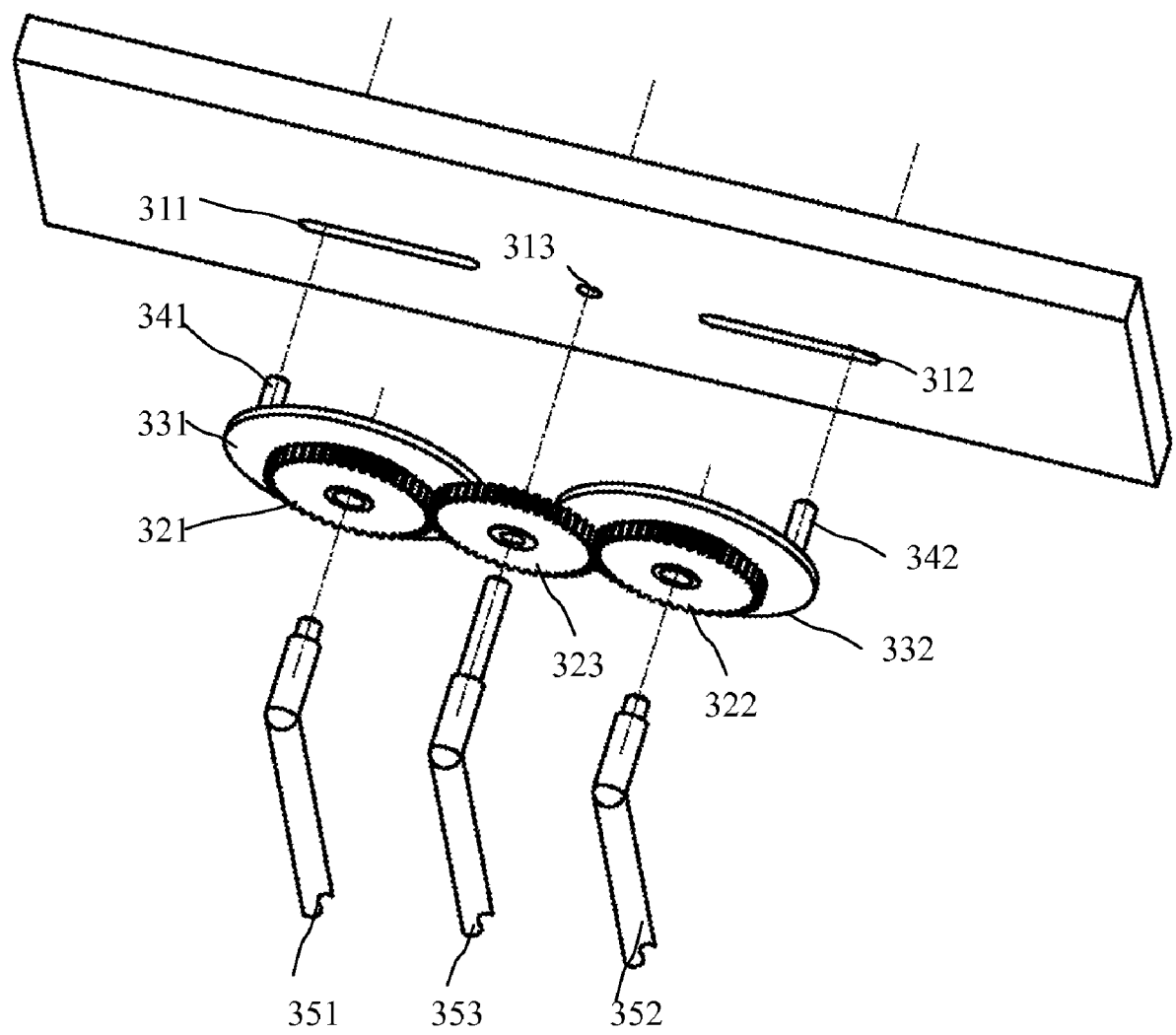
FIG. 5 illustrates the decomposed one according to FIG. 4.

FIG. 4 and FIG. 5 illustrate another mounting structure for solar panel according to the present invention. There are a frame 31, two long opening 311,312, a circular opening 313 (showed in FIG. 5), three gears 321,322,323, two disks 331, 332, two bars 341,342, three holders 351,352,353, where the three holders 351,352, and 353 is adjustable.

The frame 31 can fix a solar panel thereon. When the frame turns, the solar panel will turn thereby. The frame has two long openings 311,312 and one circular opening 313. The bar 341 connected to disk 331 works in the long opening 311, and the bar 342 connected to disk 332 works in the long opening 312. The axel of the gear 323 works in the circular opening 313. The gears 321, 322 connect to disks 331, 332 respectively. The disks 331, 332 can make a large slope degree to track the sun.

When the gear 323 turns with counterclockwise, the gears 331 and 332 will turn with clockwise so as to seesaw the frame. Certainly, the movement is driven by an AC motor or DC motor. The motor can rotate to turn the gear 323, and then make the gear 321 and 322 turn so as to seesaw the solar panel and track the sun easily. The motor can be set with rotation frequency and rotation clock to meet the tracking requirement. As long as the clockwise turning and the counterclockwise turning are controlled in each 12 hours respectively, the solar panel can produce the maximum performance.

Figure 6A:
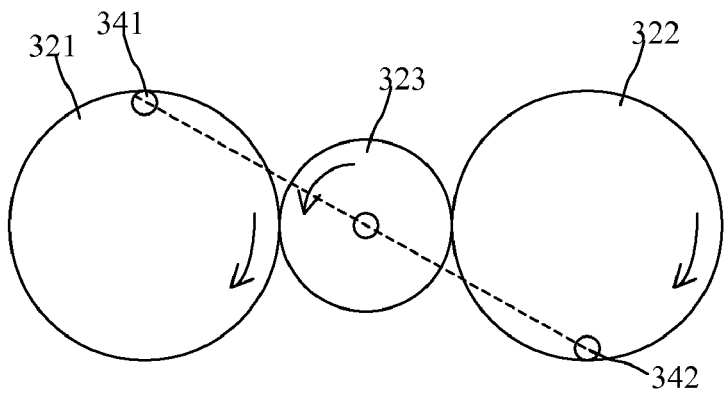
FIGS. 6(A)(B)(C)(D) illustrates the solar panel turns by the gears according to the present invention.
Figure 6B:
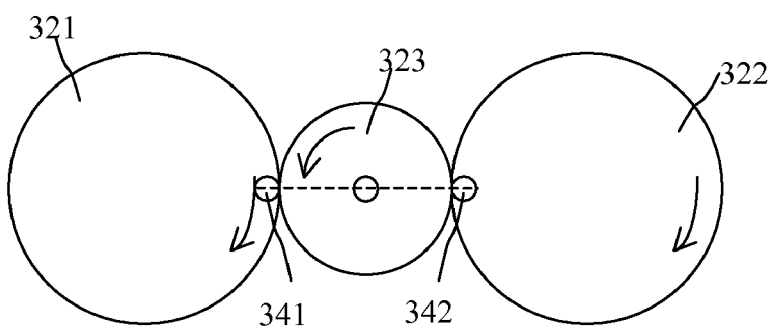
Figure 6C:
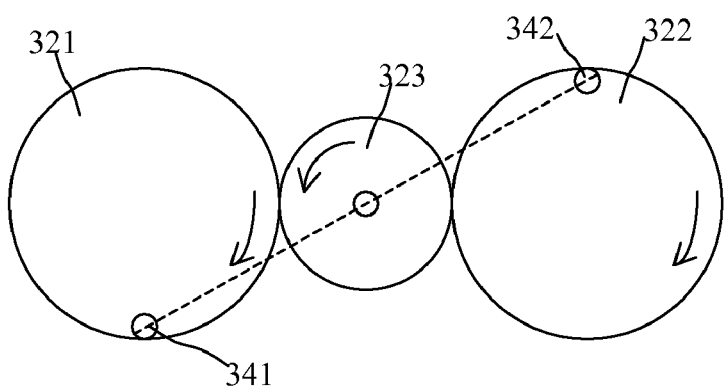
Figure 6D:
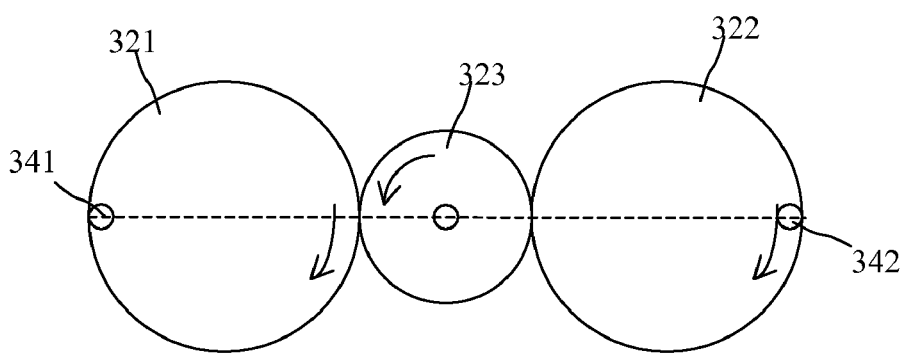

FIGS. 6(A)(B)(C)(D) illustrate the solar panel turns by the gears according to the present invention. The dotted line shows the frame seesaws by the gears 321,322,323.

To sum up, the present invention improves the conventional technique by the designs of three gears and one frame with three openings. The advantages is as follows:

1. The device provides the ability for mounted solar panel to seesaw in different angles according to the moving track of the sun in order to collect the maximum sunlight during daytime.

2. By using mechanical movement, this device is easily controlled and more durable, comparing to complicated circuit.

3. With simple structure, this device is manufactured inexpensively.

4. The diameters of three gears are adjustable for turning different angles in different areas.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A solar panel mounting structure comprising:
   a frame arranged to drive a solar panel, the frame having a first elongated opening, a second elongated opening and a third opening aligned with said first elongated opening and said second elongated opening;
   a first rotatable gear having a first bar mounted in said first elongated opening;
   a second rotatable gear having a second bar mounted in said second elongated opening; and
   a third rotatable gear disposed between said first rotatable gear and said second rotatable gear, having an axle working in said third opening,
   wherein the first, second and third rotatable gears are driven to enable the solar panel on the frame to rotate and track the sun.

2. A solar panel mounting structure according to claim 1, wherein:
   said first rotatable gear is mounted with a first disk;
   said first disk is disposed between said first rotatable gear and said frame; and
   said first bar is connected to a side of said first disk facing said first elongated opening.

3. A solar panel mounting structure according to claim 2, wherein:
   said second rotatable gear is mounted with a second disk;
   said second disk is disposed between said second rotatable gear and said frame; and
   said second bar is connected to a side of said second disk facing said second elongated opening.

4. A solar panel mounting structure according to claim 1, further comprising:
   a first holder connected to said first rotatable gear;
   a second holder connected to said second rotatable gear; and
   a third holder connected to said third rotable gear,
   wherein said first holder, said second holder and said third holder are fixed to a building.

5. A solar panel mounting structure according to claim 1, further comprising:
   a first holder connected to said first rotatable gear;
   a second holder connected to said second rotatable gear; and
   a third holder connected to said third rotatable gear,
   wherein said first holder, said second holder and said third holder are fixed to the ground.

6. A solar panel mounting structure according to claim 1, wherein:
   said third opening is a circular opening disposed between said first and second elongated openings.

7. A solar panel mounting structure according to claim 1, wherein, when said third rotatable gear is rotated in a counter-clockwise direction, said first and second rotatable gears are rotated in a clockwise direction so as to enable the frame to seesaw about the axle of said third rotatable gear working in said third opening of the frame.

8. A solar panel mounting structure according to claim 1, wherein said first, second and third rotatable gears are meshed to each other and said third rotatable gear is driven by a motor to enable the frame to seesaw about the axle of said third rotatable gear working in said third opening of the frame.

9. A mounting structure for a solar panel comprising:
   a frame arranged to drive a solar panel, the frame having a first elongated opening, a second elongated opening and a circular opening aligned with and disposed between the first elongated opening and the second elongated opening on a side surface of the frame; and
   a mesh gear assembly mounted with the side surface of the frame, via the first elongated opening, the second elongated opening and the circular opening, and driven to enable the solar panel on the frame to rotate and track the sun, the mesh gear assembly comprising:
      a first gear having a first bar mounted onto the first elongated opening;
      a second gear having a second bar mounted onto said second elongated opening; and
      a third gear disposed between the first gear and the second gear, having an axle working in said circular opening,
      wherein the first, second and third gears rotate when driven to enable the solar panel on the frame to rotate and track the sun.

10. The mounting structure according to claim 9, wherein:
    the first gear is mounted with a first disk;
    the first disk is disposed between the first gear and the frame; and
    the first bar is connected to a side of the first disk facing the first elongated opening.

11. The mounting structure according to claim 9, wherein:
    the second gear is mounted with a second disk;
    the second disk is disposed between the second gear and the frame; and
    the second bar is connected to a side of the second disk facing the second elongated opening.

12. The mounting structure according to claim 9, further comprising:
    a first holder connected to the first gear;
    a second holder connected to the second gear; and
    a third holder connected to the third gear,
    wherein the first holder, the second holder and the third holder are fixed to a building.

13. The mounting structure according to claim 9, further comprising:
    a first holder connected to the first gear;
    a second holder connected to the second gear; and
    a third holder connected to the third gear,
    wherein the first holder, the second holder and the third holder are fixed to the ground.

14. The mounting structure according to claim 9, wherein, when the third gear is rotated in a counter-clockwise direction, the first and second gears are induced to rotate in a clockwise direction so as to enable the frame to seesaw about the axle of the third gear working in the circular opening on the side surface of the frame.

15. The mounting structure according to claim 9, wherein the first, second and third gears are meshed to each other and the third gear is driven by a motor to enable the frame to seesaw about the axle of the third gear working in the circular opening on the side surface of the frame.

16. A mounting structure for a solar panel comprising:

a frame arranged to drive a solar panel mounted on a top surface, and provided with a first elongated opening, a second elongated opening and a circular opening aligned with and disposed between the first elongated opening and the second elongated opening on a side surface; and a mesh gear assembly mounted with the side surface of the frame, via the first elongated opening, the second elongated opening and the circular opening, wherein the mesh gear assembly comprises a first gear having a first bar mounted onto the first elongated opening; a second gear having a second bar mounted onto said second elongated opening; and a third gear disposed between the first gear and the second gear, having an axle working in the circular opening, and wherein the mesh gear assembly is driven by a motor set with a rotation frequency and a rotation clock to enable the first, second and third gears to rotate and the solar panel on the frame to seesaw about the axle of the third gear working in the circular opening of the side surface of the frame in order to track the sun.

17. The mounting structure according to claim 16, wherein:

the first gear is mounted with a first disk, the first disk is disposed between the first gear and the frame, and the first bar is connected to a side of the first disk facing the first elongated opening; and the second gear is mounted with a second disk, the second disk is disposed between the second gear and the frame, and the second bar is connected to a side of the second disk facing the second elongated opening.

18. The mounting structure according to claim 16, further comprising:

a first holder connected to the first gear;

a second holder connected to the second gear; and a third holder connected to the third gear, wherein the first holder, the second holder and the third holder are fixed to a building.

19. The mounting structure according to claim 16, further comprising:

a first holder connected to the first gear;

a second holder connected to the second gear; and a third holder connected to the third gear, wherein the first holder, the second holder and the third holder are fixed to the ground.

20. The mounting structure according to claim 16, wherein, when the third gear is driven by the motor to rotate in a counter-clockwise direction, the first and second gears are induced to rotate in a clockwise direction so as to enable the frame to seesaw about the axle of the third gear working in the circular opening on the side surface of the frame.

* * * * *